(12) United States Patent
Alsewailem

(10) Patent No.: US 8,900,492 B2
(45) Date of Patent: Dec. 2, 2014

(54) PROCESS FOR PREPARING INSULATION SHEETS FROM UNSEPARATED MIXTURES OF POST-CONSUMER PLASTIC ARTICLES

(75) Inventor: Fares D. Alsewailem, Riyadh (SA)

(73) Assignee: King Abdulaziz City for Science and Technology, Riyadh (SA)

(*) Notice: Subject to any disclaimer, the term of this patent is extended or adjusted under 35 U.S.C. 154(b) by 0 days.

(21) Appl. No.: 13/529,636

(22) Filed: Jun. 21, 2012

(65) Prior Publication Data

US 2012/0258298 A1    Oct. 11, 2012

Related U.S. Application Data

(62) Division of application No. 12/842,413, filed on Jul. 23, 2010, now Pat. No. 8,536,238.

(51) Int. Cl.
*B29B 17/00* (2006.01)
*C08L 25/06* (2006.01)
*B29K 25/00* (2006.01)
*B29K 67/00* (2006.01)

(52) U.S. Cl.
CPC .......... *B29B 17/0026* (2013.01); *C08L 25/06* (2013.01); *B29K 2025/00* (2013.01); *B29K 2067/00* (2013.01); *C08L 2205/03* (2013.01)
USPC .......... 264/37.1; 264/119; 264/241; 428/215; 428/220; 525/50; 525/55; 525/185; 525/190; 525/191; 425/500; 425/516; 521/40

(58) Field of Classification Search
CPC ..... B29B 17/0026; C08L 25/06; C08L 67/02; C08L 23/06; C08L 2205/02; C08L 2205/03; B29K 2025/00; B29K 2025/04; B29K 2067/00; B29K 2067/003
USPC ................ 521/40, 40.5, 46, 47, 48; 264/37.1, 264/37.26, 37.32, 331.11, 331.15, 331.17, 264/119, 241; 425/500, 516; 525/50, 55, 525/185, 190, 191; 428/215, 220
See application file for complete search history.

(56) References Cited

U.S. PATENT DOCUMENTS 4,968,463 A    11/1990  Levasseur
5,030,662 A     7/1991  Banerjie
(Continued)

FOREIGN PATENT DOCUMENTS

EP        0549497       6/1993
EP        1 151 038     9/2009
WO        98/51459      11/1998

OTHER PUBLICATIONS

Office Action for related U.S. Appl. No. 12/842,413 dated Jul. 10, 2012.

(Continued)

*Primary Examiner* — Frances Tischler
(74) *Attorney, Agent, or Firm* — Andrew M. Calderon; Roberts Mlotkowski Safran & Cole, P.C.

(57) ABSTRACT

A process for the preparation of thermal insulation sheets fashioned from certain unseparated mixtures of post-consumer plastic articles and the article, itself, is disclosed. The mixtures of such articles contain polyethylene terephthalate (PET) and polystyrene (PS) and optionally also articles made of high density polyethylene (HDPE). An unseparated mixture of such articles is provided. This mixture is crushed and shredded to form plastic flakes, and these plastic flakes are then homogenized. Homogenization of the flakes can be carried out either by melt-blending them or by further comminution to produce very fine particles of the mixed plastics. The resulting homogenized mixture of plastic types is then compression molded into sheets ranging in thickness from about 3 to 10 mm.

13 Claims, 1 Drawing Sheet

(56) References Cited

U.S. PATENT DOCUMENTS

| | | |
|---|---|---|
| 5,075,057 A | 12/1991 | Hoedl |
| 5,335,786 A | 8/1994 | Roberto |
| 6,191,228 B1 * | 2/2001 | Nosker et al. ............ 525/240 |
| 6,221,291 B1 | 4/2001 | Van Ert et al. |
| 6,228,479 B1 | 5/2001 | Zegler et al. |
| 6,231,927 B1 | 5/2001 | Ruid |
| 6,329,437 B1 | 12/2001 | Vincent et al. |
| 6,391,931 B1 * | 5/2002 | Gehlsen et al. ............ 521/50 |
| 6,494,390 B1 | 12/2002 | Khait et al. |
| 6,669,773 B2 | 12/2003 | Malloy et al. |
| 7,556,213 B2 | 7/2009 | Schwelling |
| 7,695,669 B2 | 4/2010 | Araki et al. |
| 8,101,100 B1 | 1/2012 | Brooks et al. |
| 2003/0069342 A1 * | 4/2003 | Booth et al. ............ 524/430 |
| 2009/0102088 A1 | 4/2009 | Ibaraki et al. |
| 2010/0062248 A1 | 3/2010 | Kimura et al. |

OTHER PUBLICATIONS

Office Action for related U.S. Appl. No. 12/842,413 dated Oct. 24, 2012.

Office Action for related U.S. Appl. No. 12/842,413 dated Apr. 12, 2013.

Notice of Allowance for related U.S. Appl. No. 12/842,413 dated Jul. 24, 2013.

* cited by examiner

US 8,900,492 B2

PROCESS FOR PREPARING INSULATION SHEETS FROM UNSEPARATED MIXTURES OF POST-CONSUMER PLASTIC ARTICLES

CROSS REFERENCE TO RELATED APPLICATIONS

This application is a divisional application of U.S. application Ser. No. 12/842,413, filed on Jul. 23, 2010, now U.S. Pat. No. 8,536,238, the contents of which are incorporated by reference in their entirety herein.

FIELD OF THE INVENTION

The present invention is directed to formation of insulation sheets from recycled and reclaimed waste polymeric material derived from post-consumer plastic articles.

BACKGROUND

Worldwide, many millions of tons of plastics (or polymers) are generated annually for consumer use in households and commercial establishments. Much of such amounts of post-consumer plastic enters the municipal solid waste (MSW) stream with plastics representing upwards to 20% of an MSW landfill's volume.

The majority of post-consumer waste plastic originates from packaging and containers. This includes water and soft drink bottles and cosmetic containers, as well as disposable plates, cups and cutlery. Soft drink, water and dairy product containers are frequently produced from polyethylene terephthalate (PET). Water jugs, milk jugs and shampoo bottles are frequently fashioned from high density polyethylene (HDPE). Disposable cups, plates and cutlery are frequently made from polystyrene (PS).

Most residential recycling programs in the United States and elsewhere recycle only the polyethylene terephthalate (PET) and the high density polyethylene (HDPE) portions of their collected plastics. The plastics that are not recycled are landfilled. Overall, only a small fraction of all plastics produced are recycled.

One factor which influences this relatively low recycling rate is the potential need to separate recycled plastics by type. Products prepared from unseparated recycled mixtures comprising articles of a variety of incompatible plastic types can exhibit physical, structural or other properties and characteristics which are inferior to products made from their individual parent materials. However, the practical possibilities of completely sorting mixtures of potentially incompatible plastics into groups of like plastics are very limited from the technical and economic standpoints. Prior technology thus creates the problem of what to do with unseparated mixtures of post-consumer plastic articles.

Given the foregoing situation, it would be advantageous to develop processes for producing commercially useful products from mixtures of recycled post-consumer plastic articles without the need to completely separate such articles into different streams of articles of like plastic type. Such processes could create an incentive to recycle more of the available post-consumer plastic articles, thereby sending fewer of such post-consumer plastic articles to landfills. The invention described and claimed herein addresses this need for technology for converting unseparated, i.e., at least not completely separated, mixtures of different types of post-consumer plastic articles into commercially useful structures. The invention herein thus provides a solution to the problem of how to commercially utilize unseparated mixtures of post-consumer plastic articles.

SUMMARY

The present invention is directed to a process for preparing insulation sheets from post-consumer plastic articles. The present invention is also directed to the insulation sheets produced by the process.

In Step A of the process herein, a plurality of post-consumer plastic articles is provided. Such a plurality comprises articles made from polyethylene terephthalate, articles made from polystyrene, and optionally articles made from high density polyethylene.

In Step B of the process herein, the plurality of post-consumer plastic articles is crushed to provide a mixture of plastic flakes. Such flakes will preferably range in median size from about 3 to 6 mm.

In Step C of the process herein, the mixture of plastic flakes is either melt-blended, or the flakes in the mixture are further reduced in size. Both procedures can be used to provide a homogeneous mixture of plastic material. This homogeneous mixture should comprise from about 40 wt % to 100 wt % of a combination of polystyrene (PS) and polyethylene terephthalate (PET); and from 0 wt % to about 60 wt % of high density polyethylene. The PS/PET weight ratio within the homogeneous mixture should range from about 9:1 to 2:8.

In Step D of the process herein, the homogeneous mixture of plastic material having the composition hereinbefore specified is compression molded into insulation sheets. Such sheets have a thickness of from about 3 to 10 mm. Such sheets further exhibit a thermal conductivity k of from about 0.08 to 0.12 W/m·°K.

The insulation sheets so produced can be used in a variety of applications wherein heat insulation is desired. Such sheets can be utilized individually or a plurality of these sheets can be laminated together to form an insulating structure.

BRIEF DESCRIPTION OF THE SEVERAL VIEWS OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
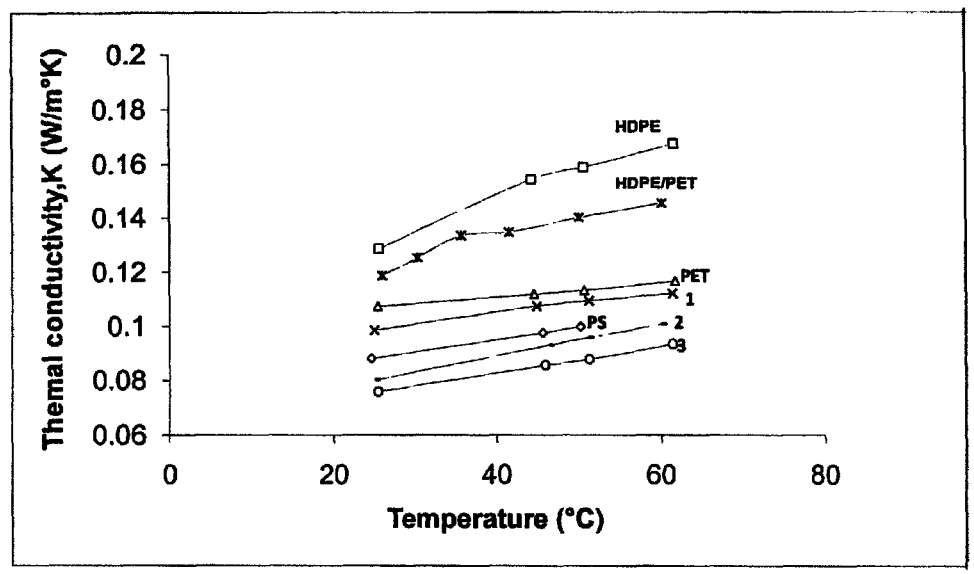
FIG. 1 is a graph showing the Thermal Conductivity, K, of insulation sheets comprising a variety of plastic mixtures as a function of temperature.

The process of the present invention generally starts with the provision in Step A of mixed municipal post-consumer plastic wastes including polyolefin and non-polyolefin components. Such post-consumer plastic waste will primarily be in the form of various types of packaging containers. The types of containers that can be used to make-up the feed stream for the process herein include but are not limited to soda and soft drink bottles, soap and shampoo bottles, cleaning supply bottles, food and condiment containers, oil containers, pesticide containers, product packaging containers, or any other container made from resin.

The plurality of plastic articles may come from a source such as a materials recovery facility and will generally include articles made of polyethylene terephthalate (PET) materials such as soda bottles, water bottles, diary product containers and other custom PET containers; polystyrene (PS) material such as disposable cups, plates and cutlery; and pigmented or unpigmented high-density polyethylene (HDPE) materials such as water jugs, milk jugs and cosmetic, e.g., shampoo, containers. This plurality of post-consumer plastic articles may also include up to about 5 wt % of articles made from other types of plastic such as polypropylene (PP), polyethylene (PE) and polyvinyl chloride (PVC), and may also include non-polymeric materials and contaminants.

The plurality of post-consumer plastic articles used as the feed stream in Step A of the process of the present invention will generally be unseparated with respect to articles of differing plastic types. For purpose of the present invention, a plurality of articles is considered to be "unseparated" if the mixture or plurality of different articles contains both articles made of polyethylene terephthalate (PET) and articles made of polystyrene (PS). Such a mixture or plurality of articles will still be considered to be "unseparated" whether articles of other types of plastic such as articles of HDPE, other polyolefins, PVC, etc., have or have not been removed therefrom.

In Step B of the process herein, the plurality of post-consumer plastic articles is subjected to a crushing step which crushes and shreds the articles and thereby reduces the plurality of articles to a mixture of plastic flakes. This crushing and shredding of the plastic articles can be carried out by using conventional machinery such as industrial crushers, shredders or granulators. More than one type of apparatus may be used to produce the requisite mixture of plastic flakes in step-wise fashion. For example, in a preferred method of treating the feed stream of post-consumer plastic articles, an industrial shredder which shreds the recyclable plastics is used first. The size of the shredded plastic can then be further reduced by chipping with rotating knives into flakes of a size suitable for use the subsequent processing steps.

The mixture of plastic flakes produced by the crushing Step B will generally comprise flakes, i.e., particles, having a median particle size of from about 3 to 6 mm. This median particle size of the plastic flakes renders the mixture of flakes suitable for processing in an extruder as hereinafter described.

At this point, some alteration of the types of plastic and other material in the mixture of flakes may optionally be carried out. For example, the flake mixture may be subjected to a washing and separation operation to effect a separation of polyolefins from non-polyolefins. Such separation may be accomplished by use of a sink-float system, hydrocyclones, water elutriation or any system which sorts materials based on density and/or hydrodynamics. In this manner, high density polyethylene (HDPE) and other polyolefins may be separated and removed from the mixture of flakes. The mixture of plastic flakes may also optionally be treated at this point to remove by density separation heavy non-plastic contaminants, such as glass, metals and fibers.

In Step C of the process herein, the mixture of plastic flakes is further treated to provide a homogeneous mixture of plastic material having a specific make-up by plastic type. The homogenized mixture of plastic will, of course, have a composition by plastic type which is largely determined by the types and amounts of articles in the feed stream which has been crushed and reduced to the mixture of plastic flakes. And as noted, optional separation treatment of the plastic flakes mixture can also alter the relative amounts of the several plastic types in the mixture to be homogenized.

The homogeneous mixture produced from the plastic flakes will generally comprise from about 40 wt % to 100 wt % of a combination of polystyrene (PS) and polyethylene terephthalate (PET) in a PS/PET weight ratio of from about 9:1 to 2:8; and from 0 wt % to about 60 wt % of high density polyethylene. More preferably, the homogenized mixture will comprise; 50 wt % to 80 wt % of the PS/PET combination and from about 20 wt % to 50 wt % of high density polyethylene. Still more preferably, the weight ratio of polystyrene (PS) to polyethylene terephthalate (PET) in the PS/PET combination will range from about 9:1 to 1:1.

Formation of the homogenized plastic mixture having the foregoing composition by plastic type can be carried out in several ways. In one embodiment, homogenization can be brought about by melt-blending the mixture of plastic flakes in a blending apparatus such as an extruder. Conventional extrusion equipment and extrusion conditions such as temperature and screw speed can be used to effect the homogenization of the plastic mixture by melt blending.

In another embodiment, a homogenized plastic mixture can be formed by treating the mixture of plastic flakes to further reduce the size of the plastic particles in such a treated mixture and by further uniformly mixing the resulting smaller particles. Reduction in particle size of the flakes in the plastic flake mixture can also be carried out using conventional comminuting apparatus. The plastic flakes can thus be treated in a grinder or hammer mill which can chop, grind or pulverize the plastic flakes to reduce their size. The homogenized plastic mixture produced in this manner will comprise a uniform mixture of particles ranging in median particle size from about 0.5 to 2.0 mm, more preferably from about 0.5 to 1.0 mm.

In Step D of the process herein, the homogenized plastic mixture, either in the form of melt-blended material from an extruder or in the form of a uniform mixture of small plastic particles, is compression molded into insulation sheets. Compression molding of such plastic mixtures can be carried out in conventional manner wherein the material to be molded is first placed in an open, heated mold cavity. The mold is closed with a top force or plug member, pressure is applied to force the material into contact with all mold areas, while heat and pressure are maintained until the molded structure is formed. Temperature of the compression molding operation can be maintained within the range of from about 170° C. to 280° C. for the particular plastic mixtures which are molded in connection with the present invention. The molded structure is then set by cooling and removed from the mold.

The insulation sheets formed by compression molding of the homogeneous plastic mixtures herein will generally range in thickness from about 3 to 10 mm. More preferably, the sheets formed herein will range in thickness from about 5 to 8 mm.

The effectiveness of such plastic sheets as insulating material can be evaluated by determining the thermal conductivity K which such sheets exhibit. Thermal conductivity is the property of a material that indicates its ability to conduct heat and is measured in watts per degree Kelvin per meter $(W \cdot °K^- \cdot m^{-1})$.

Thermal conductivity K values for pure materials are known in the art. Thermal conductivity can also be determined experimentally by using the ASTM C 177 Standard Test Method for Steady-State Heat Flux Measurements and Thermal Transmission Properties. The insulation sheets fashioned as described herein from the specific mixtures of polystyrene, polyethylene terephthalate and high density polyethylene will exhibit a thermal conductivity, K, which ranges from about 0.08 to 0.12 W/m·°K. More preferably, the insulation sheets prepared from the various combinations of post-consumer plastic articles as described herein will range from about 0.09 to 0.10 W/m·°K.

The insulation sheets prepared as described herein can be used in a wide variety of applications wherein thermal insulation materials of relatively low thermal conductivity characteristics are needed or desired. Such applications can include thermal insulation for buildings and building materials and for and in appliances and industrial equipment such as heaters, furnaces, air conditioners, refrigerators, freezers, and the like. These insulation sheets, which are relatively inexpensive to fabricate by virtue of the low cost of the unseparated post-consumer plastic raw materials used for their manufacture, can also be used as insulation in consumer articles such as coolers, thermos containers, and small electrical appliances.

The thermal insulation sheets can be used individually as desired or, alternatively, several insulation sheets can be used together. It is possible, for example, to laminate two or more of the insulation sheets herein together into a laminated composite insulating structure. In laminating two or more sheets together, it may be possible to trap air in between the plastic sheets, for example by joining the sheets to each other with an air impermeable seal all around the perimeter of the sheets or by sandwiching air-containing plastic bags between the individual laminated insulation sheets. Sheet structures of this air-trapping configuration can be even more effective for use as thermal insulation.

Preparation of the insulation sheets herein and demonstration of their thermal insulating properties are shown by the following non-limiting examples:

EXAMPLES

Mixtures of a variety of types of post-consumer plastic articles are crushed and shredded in an S-460 plastic crusher marketed by Pulian International Enterprise Co. This device is equipped with six rotating and two stationary blades and uses a 6 mm sieve to provide plastic flakes of approximately that size.

The plastic flakes produced by the crusher are melt-blended in a 26 mm co-rotating twin screw extruder (LTE26-32 marketed by LabTech Enterprises). The blended plastic from the extruder is fed into a hydraulic hot press manufactured by Santech, India and is compression molded using ~20 tons of compression force into square plastic sheets of 300 mm×300 mm dimension and which range in thickness from 5 to 9 mm.

The makeup of each the several types of sheets which are made is shown in Table 1. The first four sheets in the table are comparative examples showing, respectively, sheets of 100% HDPE, 100% PS, 100% PET and a combination of HDPE and PET with no PS. Example 1 is a sheet made form a mixed waste containing all three types of post-consumer plastic material. Examples 2 and 3 are laminated structures made with two sheets of mixed waste plastic. The Example 2 laminate has shredded low density polyethylene (LDPE) plastic bags between the two insulation sheets. Example 3 is a laminate with no bag shreds in between the sheets.

TABLE 1

Insulation Plastic Sheets and Laminates

| Example No. | Number of Sheets | Concentration of Plastic Type (wt %) | | | PS/PET Ratio PS/PET |
|---|---|---|---|---|---|
| | | HDPE | PS | PET | |
| HDPE | 1 | 100 | | 0 | 0 |
| PS | 1 | 0 | 100 | 0 | ∞ |
| PET | 1 | 0 | 0 | 100 | 0 |
| HDPE/PET | 1 | 90 | 0 | 10 | 0 |
| 1 | 1 | 61 | 4 | 35 | 0.11 |
| 2 | 2* | 61 | 4 | 35 | 0.11 |
| 3 | 2** | 61 | 4 | 35 | 0.11 |

*In between the 2 laminated insulation sheets is 14 g of shredded LDPE plastic bag material.
**No bag material is between the two laminated insulation sheets.

The plastic sheets of Table 1 are tested for thermal conductivity using a heat flow meter HFM436 manufactured by Netzsch, Germany. Thermal conductivity values for each sheet as a function of temperature are plotted graphically and are shown in FIG. 1. As can be seen from FIG. 1, the sheet made from the main waste stream of post-consumer plastics, which mainly contains PET and HDPE as major components and PS as a minor one, exhibits lower values of thermal conductivity than those of PET alone.

PS alone is conventionally used as thermal insulation, and the FIG. 1 data show that the sheets made from mixed waste as described herein can be a good insulator even though it has only a small amount of PS. This indicates that there can be an advantage of not having to separate post-consumer waste by plastic type before converting such waste to useful insulation sheets. FIG. 1 also shows that by using laminates of the post-consumer waste-derived sheets, insulating structures of even lower thermal conductivity can be realized.

Using the preparation techniques described above, a number of additional plastic sheets are made from various mixtures of post-consumer articles with these mixtures containing all three types of plastic, i.e., HDPE, PS and PET. Structures are made using varying amounts of PS relative to PET and varying amounts of the PS/PET combination relative to the amount of HDPE. The makeup of each of these several types of sheets with varying PS content is shown in Table 2.

TABLE 2

Insulation Sheets with Varying PS Content

| Example No. | Concentration of Plastic Type (wt %) | | PS Concentration in PS/PET Combo |
|---|---|---|---|
| | HDPE | PS/PET Combo | |
| 4 | 0% | 00% | 20% |
| 5 | 60% | 40% | 25% |
| 6 | 0% | 100 | 30% |
| 7 | 50% | 50% | 40% |
| 8 | 0% | 100% | 50% |
| 9 | 0% | 100% | 60% |
| 10 | 0% | 100% | 70% |
| 11 | 0% | 100% | 80% |
| 12 | 0% | 100% | 90% |

Figure 2:
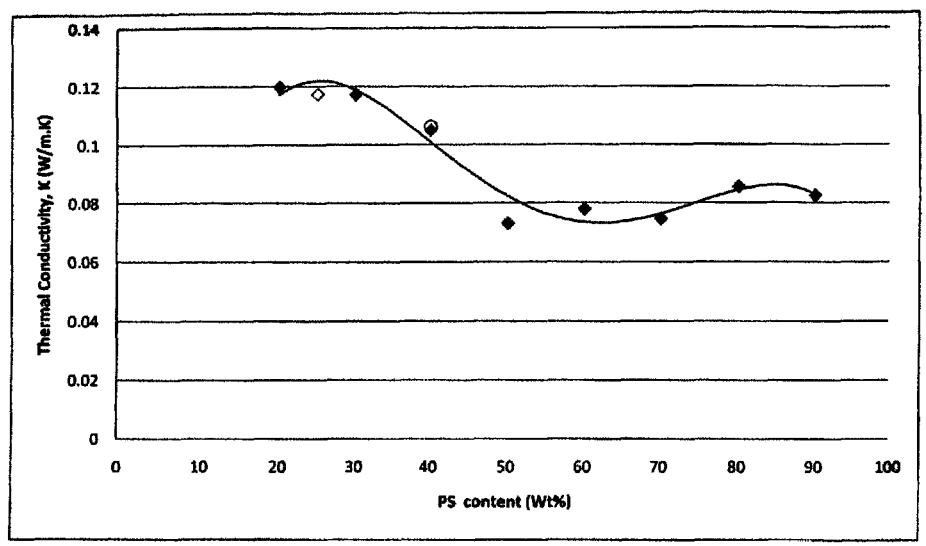
FIG. 2 is a graph showing the Thermal Conductivity K of insulation sheets comprising polystyrene, polyethylene terephthalate and high density polyethylene as a function of polystyrene content.

The plastic sheets of Table 2 are also tested for thermal conductivity, again using the HFM436 heat flow meter. Thermal conductivity values at 37° C. for each sheet as a function of PS content of the PS/PET combination are plotted graphically and are shown in FIG. 2. The hollow diamond in FIG. 2 represents the Example 5 sheet which contains 60% HDPE. The hollow circle in FIG. 2 represents the Example 7 sheet which contains 50% HDPE.

As can be seen from FIG. 2, the sheets made from the main waste stream of post-consumer plastics, which sheets contain both PS and PET, exhibit acceptable K values of thermal conductivity for use as insulation even when these two components are combined with up to 60 wt % of HDPE material. In fact, the K value for the Example 7 sheet with 50% HDPE (40% PS in the PS/PET combination) is identical to that of the Example 8 sheet with no HDPE (also with 40% PS in the PS/PET combination). FIG. 2 also shows that when the PS content in the PS/PET combination exceeds 40%, conductivity K of the sheet is significantly reduced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. Insulation sheets, wherein each insulation sheet comprises a homogeneous mixture of plastic materials comprising from about 40 wt % to 100 wt % of a combination of polystyrene (PS) and polyethylene terephthalate (PET) in a PS/PET weight ratio of from about 9:1 to 2:8; and from about 20 wt % to 50 wt % of high density polyethylene; and less than about 5% of other types of plastic, wherein the materials are obtained from a plurality of crushed, melt blended and compression molded post-consumer plastic articles forming the sheet which are devoid of heavy non-plastic contaminants including glass, metals and fibers and having a thickness of from about 3 to 10 mm, and exhibit a thermal conductivity k of from about 0.08 to 0.12 W/m·°K, wherein the insulation sheets are laminated together into a composite laminate structure with trapped air in between the insulation sheets by an air impermeable seal all around a perimeter of the insulation sheet or a sandwiching air-containing bag between individual insulation sheets, prepared by a process according to the following steps:

A) providing a plurality of post-consumer plastic articles, said plurality comprising articles made from polyethylene terephthalate, articles made from polystyrene, and from high density polyethylene and other types of plastic;

B) crushing said plurality of post-consumer plastic articles to provide a mixture of plastic flakes;

C) melt-blending said mixture of plastic flakes, or further reducing the size of particles within said mixture of plastic flakes, to thereby provide a homogeneous mixture of plastic material comprising from about 40 wt % to 100 wt % of a combination of polystyrene (PS) and polyethylene terephthalate (PET) in a PS/PET weight ratio of from about 9:1 to 2:8; and from 20 wt % to about 50 wt % of the high density polyethylene; and less than about 5% of other types of plastic; and D) compression molding said homogeneous mixture of plastic material into insulation sheets having a thickness of from about 3 to 10 mm, said insulation sheets exhibiting a thermal conductivity k of from about 0.08 to 0.12 W/m·°K.

2. The insulation sheets according to claim 1, wherein the post-consumer plastic articles comprise plastic flakes.

3. The insulation sheets according to claim 2, wherein the plastic flakes range in median particle diameter of from about 0.5 to 2.0 mm.

4. The insulation sheets according to claim 2, wherein the plastic flakes range in median particle diameter of from about 0.5 to 1.0 mm.

5. The insulation sheets according to claim 1, wherein the plastic material has a weight ratio of polystyrene to polyethylene terephthalate of from about 9:1 to 1:1.

6. The insulation sheets according to claim 1, wherein each insulation sheet has a thickness of from about 5 to 8 mm and exhibits a thermal conductivity k of from about 0.09 to 0.1 W/m·°K.

7. The insulation sheets according to claim 1, wherein the insulation sheets exhibit a thermal conductivity k of from about 0.09 to 0.1 W/m·°K.

8. The insulation sheets according to claim 1, wherein said plurality of plastic articles is selected to provide a Step C mixture of plastic material having a weight ratio of polystyrene to polyethylene terephthalate of from about 9:1 to 1:1.

9. The insulation sheets according to claim 1, wherein the plastic flakes in the Step B) mixture range in median size from about 3 to 6 mm.

10. The insulation sheets according to claim 9, wherein the plastic flakes are melt-blended in Step C using an extruder.

11. The insulation sheets according to claim 9, wherein the plastic flakes are reduced in size in Step C to an median particle diameter of from about 0.5 to 2.0 mm.

12. The insulation sheets according to claim 1, wherein said mixture of plastic material is compression molded at a temperature of from about 170° C. to 280° C.

13. The insulation sheets according to claim 1, wherein the insulation sheets produced have a thickness of from about 5 to 8 mm and exhibit a thermal conductivity k of from about 0.09 to 0.1 W/m·°K.

* * * * *